United States Patent [19]

Ohira

[11] Patent Number: 5,516,148
[45] Date of Patent: May 14, 1996

[54] SLIP ANCHOR FOR SEAT BELT DEVICE

[75] Inventor: Gozo Ohira, Hikone, Japan

[73] Assignee: Takata Corporation, Tokyo, Japan

[21] Appl. No.: 266,623

[22] Filed: Jun. 28, 1994

[51] Int. Cl.$^6$ ........................................................ B60R 22/24
[52] U.S. Cl. ............................................. 280/808; 297/483
[58] Field of Search ................................. 280/808, 801.1; 297/483, 468

[56] References Cited

U.S. PATENT DOCUMENTS

| | | | |
|---|---|---|---|
| 2,904,347 | 9/1959 | Tucker | 297/468 |
| 4,211,432 | 7/1980 | Furukawa et al. | 280/808 |
| 4,480,853 | 11/1984 | Ando et al. | 280/808 |
| 4,642,853 | 2/1987 | Plesniarski et al. | 280/808 |
| 5,207,452 | 5/1993 | Collins | 280/808 |

FOREIGN PATENT DOCUMENTS

| | | | |
|---|---|---|---|
| 2228127 | 1/1974 | Germany | 297/468 |
| 2924329 | 2/1981 | Germany | 280/808 |
| 3022178 | 12/1981 | Germany | 297/468 |
| 3414917 | 12/1985 | Germany | 280/801.1 |
| 0134354 | 6/1987 | Japan | 280/808 |

*Primary Examiner*—Margaret A. Focarino
*Assistant Examiner*—Peter C. English
*Attorney, Agent, or Firm*—Kanesaka & Takeuchi

[57] ABSTRACT

A slip anchor for a seat belt device is attached to a vehicle for guiding a webbing. The slip anchor is formed of a fixing plate to be attached to the vehicle, a guide member having an upper section fixed to the fixing plate, a lower section situated parallel to the upper section and two side sections for connecting the upper and lower sections at lateral sides thereof to thereby form a guide hole for the webbing between the upper and lower sections, and a resin coating coated over the lower section. The lower section is located parallel to and at a predetermined distance away from a plane extending through a back surface of the fixing plate, and includes a rear surface facing the plane, a lower surface facing in a direction away from the upper section, and a curved upper surface extending from an upper end of the rear surface to a front end of the lower surface. Thus, the webbing extending along the rear surface changes a direction along the curved upper surface to smoothly guide the webbing.

4 Claims, 3 Drawing Sheets

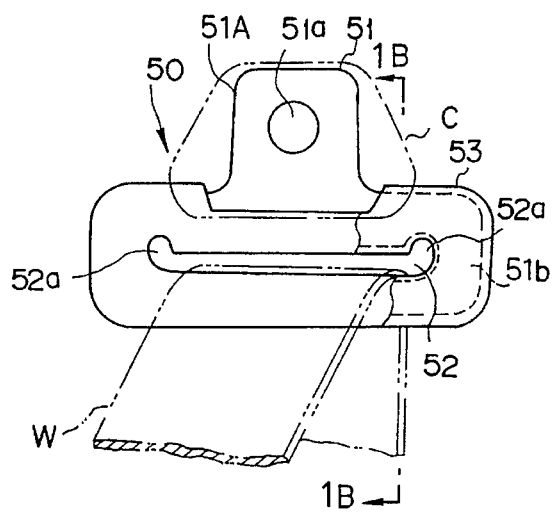
Fig. 1(A) PRIOR ART
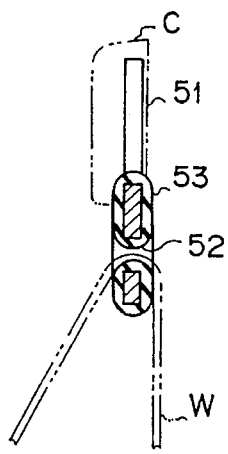
Fig. 1(B) PRIOR ART
Fig.2(A) PRIOR ART
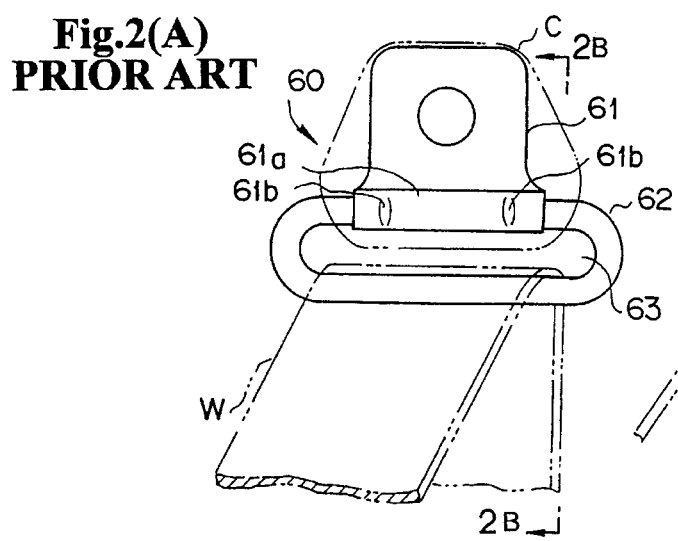
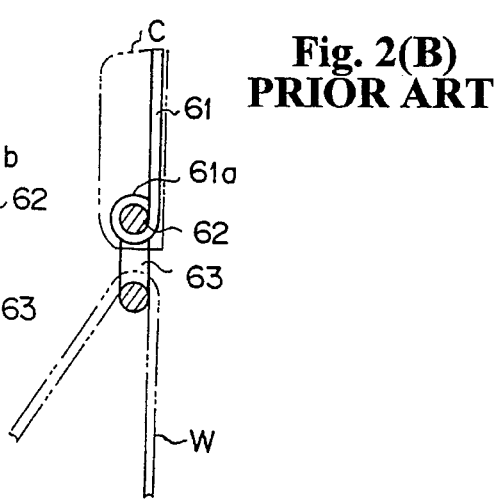
Fig. 2(B) PRIOR ART
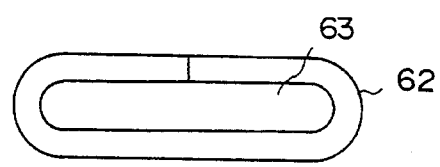
Fig. 2(C) PRIOR ART

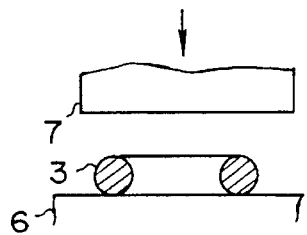
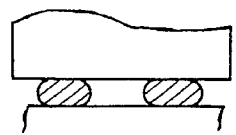
Fig. 5(A)   Fig. 5(B)
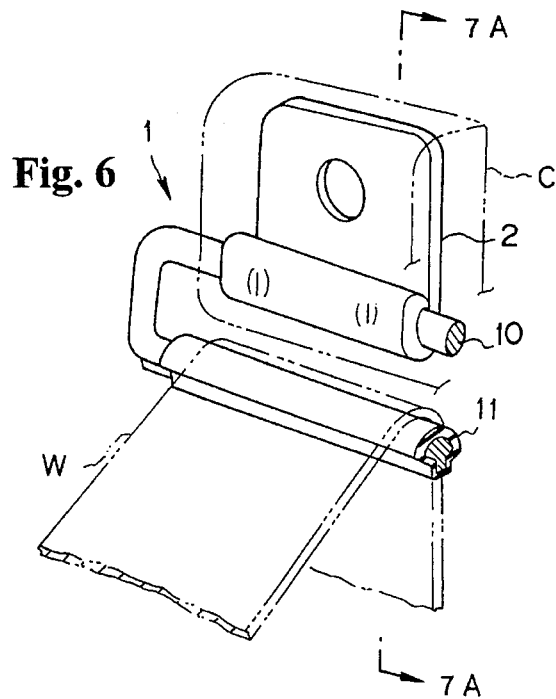
Fig. 6
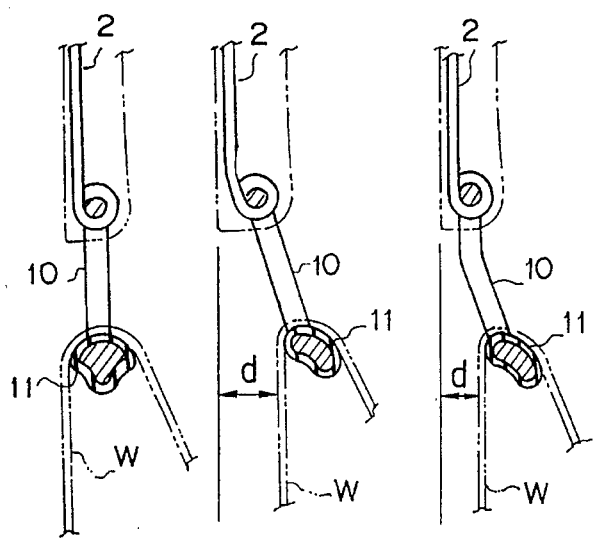
Fig. 7(A)   Fig. 7(B)   Fig. 7(C)

SLIP ANCHOR FOR SEAT BELT DEVICE

BACKGROUND OF THE INVENTION

The present invention relates to a slip anchor for a seat belt device, more particularly relates to a slid anchor for a seat belt device secured to an upper portion of a pillar of a vehicle body in order to guide a webbing extending from a take-up device of the seat belt device to a desired direction.

At present, the seat belt device is indispensable for a motor vehicle or the like in order to assure the passenger's safety because the device restrains the passenger from sudden movement caused by an acceleration or a shock by a collision.

This kind of seat belt device is comprised basically of a webbing (hereinafter, a webbing denotes a woven belt made of typical fiber materials of 50 mm width and prescribed by Japanese Industrial Standard in the specification), a retractor (hereinafter, ELR: Emergency Locking Retractor is denoted instead of a retractor) for locking withdrawal of the webbing at the time of a shock by the collision in order to restrain the passenger while retracting the webbing by a spring, a buckle device provided at a suitable position so as to fasten the webbing, a tongue, an anchor and the like.

As for the anchor, there are provided two anchors, e.g. a fixing anchor to fix an end of the webbing of a lad belt (a waist belt) on a floor of the vehicle and a slip anchor provided at an upper portion of a pillar of the vehicle by a fixing bolt or the like. The slip anchor pivots around the fixing bolt.

This slip anchor guides the webbing to change the direction of the webbing extending upward along the pillar from the ELR fixed to the pillar and located at the side position of the passenger to a front position of the passenger so as to work as a shoulder belt.

Additionally, in general, the slid anchor guides the webbing extending from the ELR to the shoulder belt position when the seat belt device is in use, or works to guide the shoulder belt to be wound in the ELR when not in use. It supports about a ton of force acting through the webbing by restraining and catching a passenger moved forward by an inertia force in case of a collision.

Therefore, the slip anchor must have a guide portion which guides the webbing smoothly in a freely movable manner and must be fixed firmly to the fixing portion such as a vehicle frame so as to withstand the force of the collision as well as the member itself must have a structure not to deform.

A slip anchor according to a conventional device is shown in FIG. 1A, in which the slip anchor 50 consists of a plate 51 formed by blanking a steel plate of prescribed thickness and a resin guide portion 53 formed by molding using a portion of the plate 51 as a core die.

The plate 51 is integrally formed of a fixing part 51A having a fixing hole 51a, and a guide part 51b having a guide opening 52, while the resin guide portion 53 having a circular cross section can smoothly guide the webbing W inserted into the guide opening 52 which has an elongated shape (Cf. FIG. 1B).

In addition, rounded portions 52a are provided at both ends of the guide opening 52 so as to prevent twisting or warping of the ends of the webbing when the webbing W is guided along the slip anchor.

In the slip anchor of this type, the guide portion and so on seen by a passenger are formed with resin to have a prescribed design in order to show quality impression. Also, because the plate 51 of the core part has a prescribed thickness, enough section modules to withstand the force of the collision is obtained by a steel section with a vertically elongated cross section.

A slip anchor according to another conventional device is shown in FIGS. 2A and 2B, in which a guide ring 62 made by bending a round steel rod into an elliptical shape in advance as shown in FIG. 2C is held in an end 61a, which is roll processed, of a fixing plate 61 for fixing a guide ring. At a pair of prescribed portions 61b, the ring 62 is fixed to the plate 61.

As is obvious from FIGS. 2A to 2C, there is provided a guide opening 63 into which the webbing W is inserted and guided with the guide ring 62 in the slip anchor 60.

Because the slip anchor of this type can be manufactured only by metal-working, the manufacturing cost can be reduced in comparison with the slip anchor shown in FIG. 1A, so that it is mainly used for a vehicle for business or the like.

Further, fixing parts are coated with resin covers C in all the slip anchors described above.

However, in the slip anchor as shown in FIG. 1A, it is made by an insertion molding, wherein the plate 51 which forms the core die at the resin molding must be buried at a prescribed position in advance, and is molded with resin.

Also, in general, a base metal is blanked in considering the material flow direction thereof at the portion 52a where a tensile force acts to obtain an enough strength in the plate 51.

Consequently, the manufacturing yield is low in each process, which causes a problem that the manufacturing cost increases.

Further, as for the slip anchors considering the cost as shown in FIG. 2A, not only the appearance is bad because a metal ring with an anti-corrosive coat is exposed, but also the section modules of the member is not enough because the guide portion where the webbing contacts is made by processing the round steel. Therefore, the material of the portion must have a large diameter not to deform by the acting power of the collision, which causes a problem that the manufacturing cost is not expected to reduce.

SUMMARY OF THE INVENTION

Taking the above mentioned problems into consideration, an object of the present invention is to provide a slip anchor for a seat belt device which has a good appearance and a large resistance against the force of the collision when provided in a motor vehicle as well as the manufacturing cost can be reduced.

In order to overcome the above mentioned objects, the present invention provides a slip anchor for a seat belt device comprising a guide member forming an insertion opening for a webbing made by bending steel and swingably attached to a vehicle body by guide member holding means. The webbing is inserted into and guided by the guide member. The guide member is press deformed so that at least a section of the guide member at a side the webbing slides is shaped into a flattened cross section in a direction that the force from the webbing is applied. The part being press deformed is used as a core for a resin coated portion so as to form a webbing guide surface. The section modules is increased by increasing the height of the guide member against the direction of the force caused by the webbing, so that the bending resistance against the bending force from the webbing and the strength of the guide member can be increased.

In this case, the manufacturing cost can be further reduced by using a round steel rod as a material, by forming an insertion opening for the webbing into an elliptical shape or by fixing the guide member to the guide member holding means with caulking process.

It is desirable to press deform the part at the side the webbing slides into a flat cross section in the direction that the force from the webbing is applied by forging process.

BRIEF DESCRIPTION OF THE DRAWINGS

FIGS. 1A and 1B are explanatory views showing an example of a conventional slip anchor for a seat belt device;

FIGS. 2A to 2C are explanatory views showing an example of a conventional slip anchor for a seat belt device;

FIGS. 5A and 5B are partially sectional views showing the condition of the guide ring shown in FIG. 3;

FIG. 6 is a perspective view showing a variation of the slip anchor shown in FIG. 3;

FIG. 7A is a longitudinal sectional view of the slip anchor shown in FIG. 6 taken along a line 7A—7A in FIG. 6; and, FIGS. 7B and 7C are longitudinal sectional views showing variations of FIG. 7A.

DETAILED DESCRIPTION OF THE PREFERRED EMBODIMENT

Hereinafter, an embodiment of the slip anchor for the seat belt device according to the present invention will be described with reference to FIGS. 3 to 7.

Figure 3:
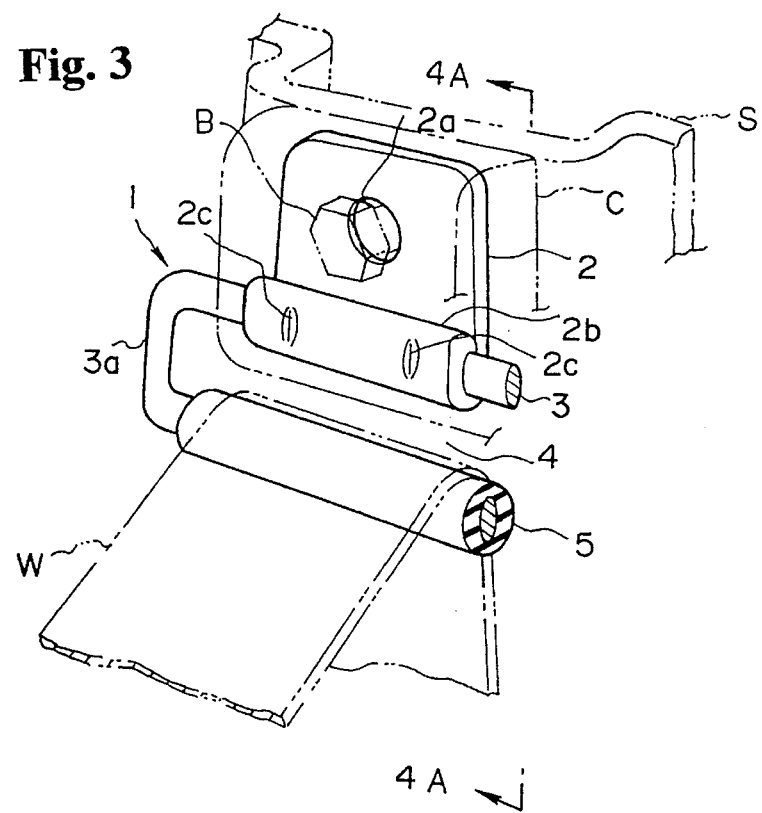
FIG. 3 is a partly cut perspective view showing an embodiment of a slip anchor for a seat belt device according to the present invention.

FIG. 3 is a general view of a slip anchor 1 in a condition that a resin cover C is removed, in which the slip anchor 1 is fixed to a pedestal S forming a portion of a pillar of a vehicle frame through a fixing plate 2 which is a guide member holding means.

The fixing plate 2 is formed by blanking a slab steel plate and there is provided a fixing hole 2a at an upper center portion thereof. The fixing plate 2 is rotatably fixed to the pedestal S by inserting a fixing bolt B into the fixing hole 2a. On the other hand, there is provided a ring holding part 2b at a bottom portion of the fixing plate 2. The ring holding portion 2b is roll processed with a fixed width, and it can hold a guide ring 3 which is a guide member. The guide ring 3 is fixed firmly by two caulking processed parts 2c.

Figures 4A, 4B, 4C:
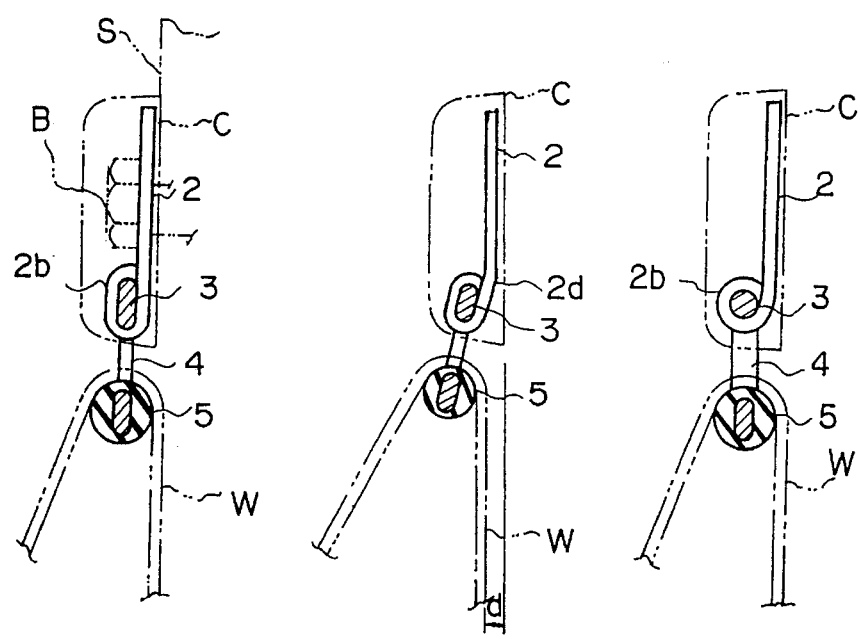
FIGS. 4A to 4C are longitudinal sectional views of the slip anchor shown in FIG. 3 and variations thereof taken along a line 4A—4A in FIG. 3.

In this embodiment, a front view of an entire figure of the guide ring 3 has a rectangular shape in which corner portions are bent within a fixed radius, and in which a cross section is shaped into a flat elliptic shape as shown in FIGS. 3 and 4A. Also, there is provided a resin slip guide part 5 constituting a webbing guide surface for a sliding part of a webbing W inserted into a guide hole 4. The resin slip guide part 5 in which the flat elliptic part is used as a core is formed to have a circular cross section and has a large radius of curvature on which the webbing W slides to be guided smoothly.

In this embodiment, however, the resin slip guide part 5 is formed only at the sliding part of the webbing W, but it may also cover a side portion 3a of the guide ring 3 to have the better appearance or it is also desirable to provide rounded edges so as to prevent a twist of the webbing during the sliding as shown in conventional devices.

Also, of course, the guide ring 3 may be shaped into an elliptic shape by a bending process as shown in conventional devices.

FIG. 4B shows a variation for providing a fixed offset between a fixing surface of the resin cover C and the webbing W.

As shown in FIG. 4B, there is provided the offset in which a fixed amount d is formed between the fixing surface of the resin cover C and the webbing W extending from ELR, not shown, by bend processing a portion 2d of the fixing plate 2 at a fixed angle.

FIG. 4C shows another variation, wherein only a part of the guide ring 3 located at the core of the resin slip guide part 5 is press deformed so as to become flat. According to this variation, it becomes possible to perform caulking process to the fixing plate which is the guide member holding means easily and accurately as well as the strength of the guide member can be increased by increasing section modules of the guide ring located at the core part of the resin slip guide part 5.

Now, FIGS. 5A and 5B show processing of the aforementioned guide ring 3.

FIG. 5A shows a guide ring blank 3, wherein a circular steel bar is previously bent into an elliptic shape as shown in FIG. 2C and as described in a conventional practice, and is placed on an anvil 6 of a press machine. The guide ring blank 3 on the anvil 6 is pressed by a flat die 7 with a fixed pressure in the direction indicated by an arrow, by which a flat elliptic shape in cross section is formed while it is forged as shown in FIG. 5B.

The modules of section against bending is increased by processing the guide ring 3 into a flat elliptic shape along the working direction on which the webbing acts, so that the bending resistance against the circular cross section is increased. In addition, it is expected that the property of the material is improved by the forging process.

Another variation of the foregoing embodiment will be described in FIGS. 6 and 7A to 7C.

When a guide ring 10 is cold forged, a slip anchor 1 shown in FIG. 6 is not made by flat die forging by flat dies 6 and 7 as shown in FIG. 5, but is made by an upset forming by a fixed die to thereby form a core of a resin guide part.

That is, as shown in FIG. 7A, the cross section of a portion constituting the core is almost semi-circular with a fixed curvature at the top and is deformed so as to form a convex shape by being pressed at the bottom while a fixing plate portion of the guide ring 10 has a circular cross section.

Further, a resin guide part 11 is formed by coating a resin over the core constituting portion, so that a fixed radius curvature is formed on the peripheral surface where the webbing slides to easily guide the webbing W.

According to this variation, although it becomes possible to make good appearance by forming a thin film with a resin coating, it also becomes possible to reduce the amount of the resin by the resin forming at the time when the resin guide part 11 is formed, so that the manufacturing costs can be reduced.

FIGS. 7B and 7C show other variations in which the cross sectional figure of the resin guide part 11 is desirably shaped in case the offset d is formed.

As shown in FIGS. 7B and 7C, the offset d can be provided by bending the fixing plate 2 or by die forging the guide ring 10 itself to incline at a fixed angle, while the blank cross section of the core part of the resin guide part 11 is cold forged into a convex shape so that the radius of the curvature of the surface where the webbing W slides becomes large.

In this variation, because a contact surface where the webbing W slides is not made symmetrical with respect to the axis of the guide ring 10, a twisting shear occurs in the guide ring 10. However, the webbing W can be guided smoothly.

In the afore-mentioned embodiments, although, variations of a shoulder anchor fixed to the pillar of a motor vehicle are particularly explained as a slip anchor for a seat belt, this invention can be used as a tongue to fix a webbing to a buckle device, thereby improving the mechanical property of the tongue and reducing the manufacturing costs.

As described, according to the present invention, it becomes possible to provide a slip anchor consisting of a guide member forged into a fixed flat shape, and the guide member is formed with resin. Therefore, it becomes possible to form the parts with less amount of resin, and to increase deformation resistance at the time of applying load by increasing section modules of the member and by improving the strength of the material. Therefore, the amount of the using materials can be limited, so that it is effective to improve the appearance and to reduce the manufacturing costs.

What is claimed is:

1. A slip anchor for a seat belt device adapted to be attached to a vehicle for guiding a webbing, comprising:

a fixing plate to be attached to the vehicle and having a back surface, a guide member including an upper section fixed to the fixing plate, a lower section situated parallel to the upper section, and two side sections connecting the upper and lower sections at lateral sides thereof to thereby form a guide hole between the upper and lower sections, said lower section being located parallel to and at a predetermined distance away from a plane extending through the back surface of the fixing plate and including a rear surface facing said plane and having an upper end, a lower surface facing in a direction away from the upper section and having a front end, a curved upper surface extending from the upper end of the rear surface to the front end of the lower surface so that the webbing extending along the rear surface changes a direction along the curved upper surface to smoothly guide the webbing, and a curved bottom surface extending between the rear surface and the lower surface so that the lower section has an elongated curved shape in cross section perpendicular to said plane, and a resin coating coated over the lower section of the guide member.

2. A slip anchor according to claim 5, wherein said upper section has a circular shape in cross section, a curvature of the curved upper surface of the lower section being greater than a curvature of the upper section.

3. A slip anchor according to claim 2, wherein said fixing plate has a fixing portion attached to the upper section of the guide member, said fixing portion being inclined relative to said plane.

4. A slip anchor according to claim 2, wherein said side sections are bent in a direction away from said plane.

* * * * *